Dec. 21, 1926.
J. A. EWEN
1,611,731
ADJUSTABLE BLOCK AND HOOK FOR MOUNTING PRINTING SURFACES
Filed Oct. 25, 1924
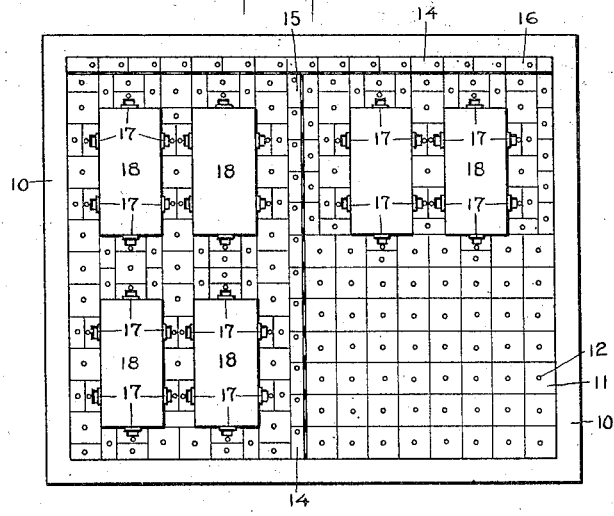
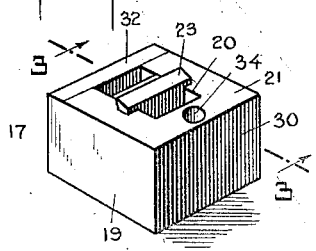
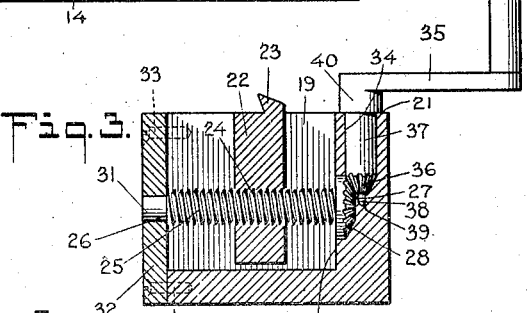
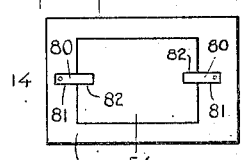
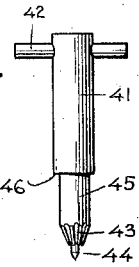
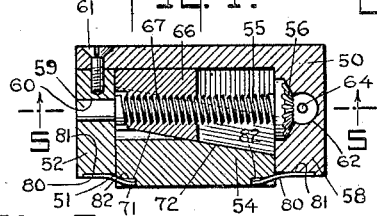
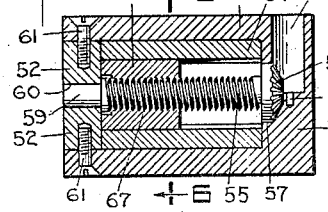
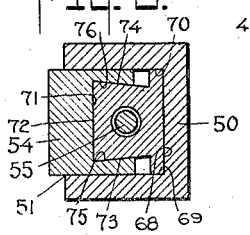
INVENTOR,
John A. Ewen,
BY
Henry J. Lucke
His ATTORNEY.

Patented Dec. 21, 1926.

1,611,731

UNITED STATES PATENT OFFICE.

JOHN A. EWEN, OF BROOKLYN, NEW YORK.

ADJUSTABLE BLOCK AND HOOK FOR MOUNTING PRINTING SURFACES.

Application filed October 25, 1924. Serial No. 745,900.

This invention relates to adjustable blocks and hooks for mounting printing surfaces.

An object of this invention is to devise improved forms of printers' plate holding devices whereby the printing plate may be adjustably set in a chase or other mounting base.

The invention is applicable for furniture or blocks for use in filling the spaces within the chase and also in respect to the hooks or clamps mounted between or on such furniture and for directly engaging the printing surfaces, whereby adjustment may be readily had in respect to the precise location and alignment of the printing surface or surfaces within the chase and any desired location and position of each printing plate in the chase may be accurately had and independently of one another.

My hook or catch comprises in its preferred forms a threaded shaft, a movable block carrying the hook or catch proper and in threaded relation with said threaded shaft, a casing for rotatively mounting said threaded shaft, a beveled gear carried by said threaded shaft, said casing being provided with an opening extending transversely to the axis of said threaded shaft and providing access to said beveled gear and an adjusting manipulating member carrying a beveled gear and affording adjustment of said threaded shaft and therewith of said movable block upon insertion of said adjusting member within said opening by meshing its beveled gear with the beveled gear on said threaded shaft.

Pursuant to the most preferred forms of my invention as applied to furniture blocks, such block comprises a rotatably mounted, threaded shaft, a pair of coacting wedge members, one of said wedge members being in threaded relation with the threading of said threaded shaft to be adjustably displaced longitudinally of the threaded shaft upon rotation of the threaded shaft in the desired direction, the other of said wedge members being movably mounted in the casing of the block and displaced transversely to the direction of length of the threaded shaft upon the aforesaid longitudinal displacement of the first-named wedge member and an adjusting manipulating member comprising a pin carrying a beveled gear or equivalent for floatingly meshing with a coacting bevel gear fixed on the threaded shaft and inserted in a suitable opening in the casing of the block.

Further features of the invention will be more fully understood from the following detail description and the accompanying drawings, in which—

Fig. 1 is a diagrammatic plan view of a printer's chase provided with furniture blocks, certain of which embody my hook or catch; this figure also shows blocks or wedges embodying my invention;

Fig. 2 is a perspective view of one form of hook or catch indicated in Fig. 1, and on a greatly enlarged scale;

Fig. 3 is a sectional elevation on line 3—3 of Fig. 2, showing the interior construction of my hook or catch and on a still larger scale; this figure also shows one form of my manipulating member;

Fig. 4 is a central horizontal sectional view of one of my adjustable blocks or wedges indicated in Fig. 1, and on an enlarged scale;

Fig. 5 is a sectional elevation on line 5—5 of Fig. 4;

Fig. 6 is a sectional elevation on line 6—6 of Fig. 5;

Fig. 7 shows a modified form of my adjustable manipulating member;

Fig. 8 is a front elevation of my adjustable block; and

Fig. 9 is an enlarged detail of the point of my key.

Referring to Fig. 1, the chase 10 is of any suitable form for printing purposes and comprises generally an open frame of rectangular or other suitable shape and may be either of the flat types as will be understood for use for flatbed forms of printing presses.

Within the opening of the frame, see Fig. 1, I have indicated a desired number of blocks 11 of the non-adjustable form, that is to say, of solid metal of substantially square or other rectangular contour and provided with a perforation or recess 12 to receive the bent head of the regulation pin for removal or insertion of any desired block 11.

The blocks 14 positioned substantially centrally within the frame 10 to form the row 15 and the blocks 14 forming substantially horizontal row indicated 16 in Fig. 1 are preferably of adjustable type, namely as indicated in Figs. 4, 5, and 6, set forth more particularly hereinafter.

Coacting with such adjustable blocks 14,

I have arranged the adjustable hooks or catches 17 of the construction indicated in Figs. 2 and 3, described more fully hereinafter. Such hooks or catches are placed within the printer's chase 10 in number and at the general locations as is required by the positions of the respective printing surfaces 18 desired to be mounted in the chase. For the type of work represented by the chase and enclosed furniture indicated in Fig. 1, six adjustable hooks or catches 17 are usually required for each printing plate 18, namely two on each of the opposite sides of the length of the plate and one at each of the opposite ends, usually spaced substantially equally from the corners of the printing surfaces.

A preferred form of my hook or catch is illustrated in Figs. 2 and 3. The casing 19 is slotted at 20 on its top 21, and through the slot 20 projects the block 22 having a head 23 formed as a hook or catch. The block 22 has an opening 24 threaded to mesh with the threading 25 of the shaft 26. The shaft 26 carries at its one end the beveled gear 27 rotatively received within the recess 28 formed in the inner face 29 of the end 30 of the casing 19. The opposite end 31 of the shaft 26 is rotatively mounted in the opposite end 32 of the casing 19. The end 32 may be secured to the body of the casing 19 by screws 33 or by a pressure fit as desired. The end 31 of the shaft 26 may be reduced in diameter, as shown in Fig. 3.

The cylindrical opening 34 in the end 30 of the casing 19 extends transversely to the axis or direction of length of the threaded shaft 26, and preferably centrally in the end 30 and opening at the top 21 of the casing 19 and provides access by the manipulating member 35, see Fig. 3, for setting the position of the hook or wedge 23, namely, by affording the meshing of the beveled gear 36 at the lower end of the cylindrical stem 37 of the manipulating member 35. The cylindrical opening 34 has a diameter but slightly greater than that of the cylindrical stem 37 to thereby rotatively align the stem 37 therein. The manipulating member 35 is further provided with the centering projection 38 received within the central recess 39 and the member 35 is enlarged in diameter as indicated at 40, to serve as a bearing surface on the upper face 21 of the end 30 of the casing 19.

In lieu of the use of a manipulating member 35, of the crank form, a manipulating member of the type shown in Fig. 7 may be employed, and comprising a relatively elongated shank 41, having a cross-pin 42 at its head and arranged to be manually grasped. At its lower end is formed a beveled gear 43, corresponding to the beveled gear 36 of the manipulating member 35. The projection 44 corresponds to the projection 38, namely for aligning or centering the beveled gear 43 when its stem 45 is inserted in the opening 34 of the casing of my adjustable catch. The diameter of the stem 45 of my manipulating member 41 corresponds to that of the stem 37 of my manipulating crank member 35, and provides for the bearing surface 46.

A preferred form of my adjustable block 14, see Figs. 4, 5 and 6, comprises a casing 50 open-sided as indicated at 51, see Figs. 4 and 6, and having an end piece 52, see Fig. 5. In the opening of the open side 51 of the casing 50 is positioned the displaceable wedge member 54. The threaded shaft 55 carries at its one end the beveled gear 56, rotatively received within the opening 57 on the inner face of the end 58 of the casing 50. The opposite end 59 of the threaded shaft 55 may be reduced in diameter to serve as a bearing within the opening 60 in the end piece 52. The end piece 52 may be secured by screws 61 or by a pressure fit or by swaging. The cylindrical opening 62 is provided in the end 58, extending transversely to the direction of length of the threaded shaft 55, for receiving the beveled gear 36 of my adjustable crank 35 or the beveled gear 43 of my manipulating member 41, intermeshed with the beveled gear 56 of the threaded shaft 55. The central recess 64 of the opening corresponds to the central recess 39 of the opening 34 of the hook or catch, described hereinabove.

The inner wedge member 66 is threaded within its inner opening 67 corresponding to the threading of the threaded shaft 55. The lateral side face 68 and the opposite top and bottom faces 69, 70 of the inner wedge member 66 are substantially smooth, to make substantially smooth sliding fit with the corresponding surfaces on the inner faces of the block casing 50. The threaded opening 67 of the inner wedge member 66 extends substantially parallel to its flat lateral surface 68. The outer lateral face 71, see Figs. 4 and 6, extends at an angle to the direction of extension of its opening 67, which angle may be varied as desired. It will be noted from Fig. 4, that the inner wedge member 66 is of a length materially less than the length of the inner clearance within the casing 50 of the adjustable block, thereby permitting movement of the inner wedge member 66 within the inner space of the casing 50 longitudinally of the threaded shaft 55.

The outer wedge member 54, see Fig. 4, is of a length substantially that of the opening 51 of the open side of the casing 50 and to permit reciprocating movement to more or less extent within the opening 51. The outer wedge member 54 is provided with a transverse surface 72 substantially uniplanar with the transverse surface 71 of the inner wedge member 66, whereby upon movement of the inner wedge member 66, see Fig. 4, say to the right, its surface 71 rides upon the surface 72 of the outer wedge member 54, thus forcing the outer wedge member 54 outwardly of the opening 51.

In order to provide for the automatic return of the outer wedge member 54 upon reverse rotation of the shaft 55, namely by moving the inner wedge member 66 towards the left from a position to the right of that shown in Fig. 4, I provide the inner wedge member 66 with oppositely disposed beveled faces 73, 74, received within the correspondingly beveled faces 75, 76, on the inner face of the outer wedge member 54, whereby upon the return rotation of the shaft 55 and consequent return longitudinal movement of the inner wedge member 66, the outer wedge member 54 automatically recedes into the opening 51. The springs 80, 80, see Fig. 8, may be employed to assist in returning the outer wedge member 54. Such springs 80, 80, are preferably respectively secured at their fixed ends within the countersunk grooves 81, and their free ends are received in countersunk grooves 82.

The centering or aligning opening 39 at the bottom of the recess 34, see Fig. 3, and of the centering opening 64 of the recess 62, see Fig. 5, is preferably conical, as indicated in enlargement in Fig. 9, and the projection 38 of the manipulating member 35 is preferably sharpened and similarly the projection of the manipulating member 41. Such pointed projection 38 of my crank key 35 or pointed projection 44 of my straight key 41 insures accurate centering within the conical countersunk recess notwithstanding dust or other foreign matter which may lodge in the recess.

From the above, it will be perceived that my invention is applicable in the aforesaid forms for adjusting the position of the one or more printing plates desired to be mounted in the chase. The adjustable wedge block or sectional base embodying my invention is advantageous in forming a horizontal row such as the uppermost row 16 indicated in Fig. 1, or in forming a more or less central row such as the row 15 in Fig. 1, and non-adjustable block furniture or sectional bases may be employed to fill the remaining space. The positioning and alignment of the respective printing plates 18 is attained by means of my adjustable hooks or catches 17, usually by the employment of four or six adjustable hooks or catches 17, such as two on each of the longer sides of each printing plate 18 and one at the top and bottom sides, namely by locating the printing plate within the notch 23 of each hook or catch 17, and the adjustment secured by meshing the bevel gear of my key with the bevel gear of the threaded shaft.

My invention affords a most expeditious means for aligning the printing surfaces as may be desired.

My invention in the form of my adjustable block is applicable to engravings and the like mounted on wooden or other bases, and may be made of high and low dimensions as desired. When it is desired to re-align or shift the position of any printing plate 18, its hooks or catches 17 are readily unlocked by turning with my key in the proper direction and the printing plate re-set in position and alignment upon tightening the hooks or catches by turning with my key in the opposite direction.

My invention is particularly useful in multi-color work and generally for registering printing plates whether mounted on metal or on wooden bases, and similarly in letter-press work, and obviates the need of quoins, or metal or paper inserts for locking up the chase.

Whereas, I have described my invention by reference to specific forms thereof, it will be understood that many changes and modifications may be made without departing from the spirit of the invention.

I claim:

1. A device for adjusting the position of a printing plate in a chase or the like, which comprises a hollow block having an integral end face portion provided with a substantially cylindrical opening and a substantially circular recess extending substantially at right angles to said opening and connecting said opening with the interior of said hollow block, the end face portion of said hollow block opposite said integral end face portion being provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot and a coacting wedge member disposed within said hollow block, said coacting wedge member being provided with a perforation extending through its body portion and internally threaded to mesh with the threading of said threaded shaft.

2. A device for adjusting the position of a printing plate in a chase or the like, which comprises a hollow block having an integral end face portion provided with a substantially cylindrical bottom opening having a substantially central aperture disposed in its bottom, and a substantially circular recess extending substantially at right angles to said opening and connecting said opening with the interior of said hollow block, the end face portion of said hollow block opposite said integral end face portion being provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot and a coacting wedge member disposed within said hollow block, said coacting wedge member being provided with a perforation extending through its body portion and internally threaded to mesh with the threading of said threaded shaft.

3. A device for adjusting the position of a printing plate in a chase or the like, which comprises a hollow block having an integral end face portion provided with a substantially cylindrical opening and a substantially circular recess extending substantially at right angles to said opening and connecting said opening with the interior of said hollow block, the end face portion of said hollow block opposite said integral end face portion being removably positioned relative to the bottom portion of said hollow block and provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot and a coacting wedge member disposed within said hollow block, said coacting wedge member being provided with a perforation extending through its body portion and internally threaded to mesh with the threading of said threaded shaft.

4. A device for adjusting the position of a printing plate in a chase or the like, which comprises a hollow block having an integral end face portion provided with a substantially cylindrical bottom opening having a substantially central aperture disposed in its bottom and a substantially circular recess extending substantially at right angles to said opening and connecting said opening with the interior of said hollow block, the end face portion of said hollow block opposite said integral end face portion being removably positioned relative to the bottom portion of said hollow block and provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot and a coacting wedge member disposed within said hollow block, said coacting wedge member being provided with a perforation extending through its body portion and internally threaded to mesh with the threading of said threaded shaft.

5. A device for adjusting the position of a printing plate in a chase or the like, which comprises a hollow block having an integral end face portion provided with a substantially cylindrical opening and a substantially circular recess extending substantially at right angles to said opening and connecting said opening with the interior of said hollow block, the end face portion of said hollow block opposite said integral end face portion being provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot having its wedge face disposed in a plane substantially at right angles to the longitudinal direction of said longitudinally extending slot and a coacting wedge member disposed within said hollow block, said coacting wedge member being provided with a perforation extending through its body portion and internally threaded to mesh with the threading of said threaded shaft.

6. A device for adjusting the position of a printing plate in a chase or the like, which comprises a hollow block having an integral end face portion provided with a substantially cylindrical opening and a substantially circular recess extending substantially at right angles to said opening and connecting said opening with the interior of said hollow block, the end face portion of said hollow block opposite said integral end face portion being provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot, a coacting wedge member disposed within said hollow block, said coacting wedge member being provided with a perforation extending through its body portion and internally threaded to mesh with the threading of said threaded shaft and spring means for imparting said first-named wedge member in its receding movement within said slot.

7. A device for adjusting the position of a printing plate in a chase or the like, which comprises a hollow block having an integral end face portion provided with a substantially cylindrical opening and a substantially circular recess extending substantially at right angles to said opening and connecting said opening with the interior of said hollow block, the end face portion of said hollow block opposite said integral end face portion being provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot and a coacting wedge member disposed within said hollow block, said coacting wedge member being provided with a perforation extending through its body portion and internally threaded to mesh with the threading of said threaded shaft, said coacting wedge member being further provided with a face slidingly engaging an inner face of said hollow block.

8. A device for adjusting the position of a printing plate in a chase or the like, which comprises a hollow block having an integral end face portion provided with a substantially cylindrical bottom opening having a substantially central aperture disposed in its bottom and a substantially circular recess extending substantially at right angles to said opening and connecting said opening with the interior of said hollow block, the end face portion of said hollow block opposite said integral end face portion being provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot and a coacting wedge member disposed within said hollow block, said coacting wedge member being provided with a perforation extending through its body portion and internally threaded to mesh with the threading of said threaded shaft, said coacting wedge member being further provided with a face slidingly engaging an inner face of said hollow block.

9. A device for adjusting the position of a printing plate in a chase or the like, which comprises a hollow block having an integral end face portion provided with a substantially cylindrical opening and a substantially circular recess extending substantially at right angles to said opening and connecting said opening with the interior of said hollow block, the end face portion of said hollow block opposite said integral end face portion being removably positioned relative to the bottom portion of said hollow block and provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot and a coacting wedge member disposed within said hollow block, said coacting wedge member being provided with a perforation extending through its body portion and internally threaded to mesh with the threading of said threaded shaft, said coacting wedge member being further provided with a face slidingly engaging an inner face of said hollow block.

10. A device for adjusting the position of a printing plate in a chase or the like, which comprises a hollow block having an integral end face portion provided with a substantially cylindrical bottom opening having a substantially central aperture disposed in its bottom and a substantially circular recess extending substantially at right angles to said opening and connecting said opening with the interior of said hollow block, the end face portion of said hollow block opposite said integral end face portion being removably positioned relative to the bottom portion of said hollow block and provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot and a coacting wedge member disposed within said hollow block, said coacting wedge member being provided with a perforation extending through its body portion and internally threaded to mesh with the threading of said threaded shaft, said coacting wedge member being further provided with a face slidingly engaging an inner face of said hollow block.

11. A device for adjusting the position of a printing plate in a chase or the like, which comprises a hollow block having an integral end face portion provided with a substantially cylindrical opening and a substantially circular recess extending substantially at right angles to said opening and connecting said opening with the interior of said hollow block, the end face portion of said hollow block opposite said integral end face portion being provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot having its wedge face disposed in a plane substantially at right angles to the longitudinal direction of said longitudinally extending slot and a coacting wedge member disposed within said hollow block, said coacting wedge member being provided with a perforation extending through its body portion and internally threaded to mesh with the threading of said threaded shaft, said coacting wedge member being further provided with a face slidingly engaging an inner face of said hollow block.

12. A device for adjusting the position of a printing plate in a chase or the like, which comprises a hollow block having an integral end face portion provided with a substantially cylindrical opening and a substantially circular recess extending substantially at right angles to said opening and connecting said opening with the interior of said hollow block, the end face portion of said hollow block opposite said integral end face portion being provided with an aperture, another face portion of said hollow block being provided with a longitudinally extending slot, a threaded shaft, a beveled gear secured to one end of said shaft and rotatively mounted in said substantially circular recess, the opposite end of said threaded shaft being journalled in said aperture, a wedge member movably mounted in said slot, a coacting wedge member disposed within said hollow block, said coacting wedge member being provided with a perforation extending through its body portion and internally threaded to mesh with the threading of said threaded shaft, said coacting wedge member being further provided with a face slidingly engaging an inner face of said hollow block and spring means for imparting said first-named wedge member in its receding movement within said slot.

In testimony whereof I have signed this specification this 25th day of October 1924.

JOHN A. EWEN.